United States Patent [19]

Schönfeld et al.

[11] Patent Number: 5,760,147
[45] Date of Patent: Jun. 2, 1998

[54] POLYAMIDE FOAMS AND PROCESS FOR THEIR PRODUCTION

[75] Inventors: Axel Schönfeld, Wiesbaden; Georg Frank, Tübingen; Andreas Schleicher, Beselich; Helmut Scheckenbach, Langen; Siegfried Weis, Eppstein, all of Germany

[73] Assignee: Hoechst Aktiengesellschaft, Germany

[21] Appl. No.: 634,502

[22] Filed: Apr. 18, 1996

[30] Foreign Application Priority Data

Apr. 15, 1995 [DE] Germany ............... 195 14 320.5

[51] Int. Cl.$^6$ ................................................ C08G 75/00
[52] U.S. Cl. ................... 525/535; 525/537; 525/540; 528/331
[58] Field of Search .................. 525/64, 535, 537, 525/540; 528/331

[56] References Cited

U.S. PATENT DOCUMENTS 5,240,819  8/1993  Mueller et al. .................. 528/335

FOREIGN PATENT DOCUMENTS

A-96 05246  2/1996  WIPO.
A-96 05252  2/1996  WIPO.

OTHER PUBLICATIONS

Database WPI Week 8851 Derwent Publications Ltd., London, GB; An 88–365210 XP002008792 (Kanebo KK), 14 Nov. 1988.

Primary Examiner—John M. Cooney, Jr.
Attorney, Agent, or Firm—Connolly & Hutz

[57] ABSTRACT

A molding composition or mixture comprising a polyamide and at least one polymer containing sulfoxide groups serves for the production of a foam material by the action of heat. The foam material is used for moldings and heat-resistant insulation layers.

10 Claims, No Drawings

POLYAMIDE FOAMS AND PROCESS FOR THEIR PRODUCTION

The invention relates to a molding composition based on mixtures comprising polymers containing sulfoxide groups and a polyamide, and a process for producing a foamed polyamide by thermal treatment of the molding composition.

Polymer compositions are customarily foamed by adding to the polymer composition a low molecular weight blowing agent which liberates gaseous dissociation products on heating.

It has surprisingly been found that mixtures of a polyamide with polymers containing sulfoxide groups easily form a foam. The polymer containing sulfoxide groups decomposes under the action of heat to form gases which lead to foaming of the polymer composition.

The invention provides a molding composition comprising a polyamide and at least one polymer containing sulfoxide groups.

Suitable polyamides are, for example, aliphatic, aromatic and aliphatic-aromatic homopolyamides, aliphatic and aromatic copolyamides and their mixtures. Polyamides used are, for example, semicrystalline and amorphous polyamides having a molecular weight of >5,000, preferably from 5,000 to 70,000 and in particular from 10,000 to 65,000, which are generally known as ®Nylon. These include polyhexamethyleneadipamide (Nylon 66), polyhexamethyleneazelaamide (Nylon 69), polyhexamethylenesebacamide (Nylon 610), polyhexamethylenedodecanediamide (Nylon 612), polytetramethyleneadipamide (Nylon 46), polydodecanemethylenedodecanamide (Nylon 1212), polycyclamide cyclamide Q2 (Nylon C8). Also used are polyamides prepared by ring opening of lactams such as polycaprolactam (Nylon 6), polylaurolactam (Nylon 12), poly-11-aminoundecanoic acid (Nylon 11) and di(p-aminocyclohexyl)methanedodecanediamide. Aromatic polyamides such as polyxylyleneadipamide (Nylon MXD 6), polytrimethylhexamethyleneterephthalamide (Nylon 6-3-T), polyhexamethylenediamineterephthalamide and polyhexamethyleneisophthalamide are also suitable. Other polyamides used are those which are prepared by copolymerization of at least two of the abovementioned polymers or their formative components, for example a copolymer of adipic acid, isophthalic acid and hexamethylenediamine.

The polyamides are preferably linear and have a melting point above 170° C. Particularly suitable examples of these polyamides are polyamide 46 (structural units present: —NH—(CH$_2$)$_4$—NH—CO—(CH$_2$)$_6$—CO—) and polyamide 66 and also blends of these two polyamides.

Polyamides are described in "Ullmann's Encyclopedia of Industrial Chemistry, Vol. A21, Chapter 'Polyamides', VCH Publishers, Weinheim/New York 1992, pages 179–205", which is hereby incorporated by reference.

For the purposes of the present invention, polymers containing sulfoxide groups are polymers or oligomers which contain at least one arylene sulfoxide unit (—Ar—SO—; Ar=arylene). The arylenes are based on, for example, monocyclic or polycyclic aromatics which can be monosubstituted or polysubstituted. Examples are phenylene, biphenylene (—C$_6$H$_4$—C$_6$H$_4$—), naphthalene, anthracene or phenanthrene.

Examples of substituents are straight-chain, cyclic or branched C$_1$–C$_{20}$-hydrocarbon radicals such as C$_1$–C$_{10}$-alkyl radicals, e.g. methyl, ethyl, n-propyl, iso-propyl, n-butyl, t-butyl, n-hexyl, or C$_6$–C$_{14}$-aryl radicals, e.g. phenyl or naphthyl, halogens, sulfoxyl, amino, nitro, cyano, hydroxy, alkyloxy or carboxyl groups.

Preferred polymers containing sulfoxide groups are polyarylene sulfide sulfoxides and polyarylene sulfoxides, in particular polyphenylene sulfide sulfoxide and polyphenylene sulfoxide, which can easily be prepared, for example, by partial or complete oxidation of the sulfur groups of polyarylene sulfides with ozone, nitric acid or NO$_2$/N$_2$O$_4$. A favorable proportion of sulfoxide has been found to be one of at least 50%, in particular at least 95% (based on all sulfur-containing bridges in the polymer). Hereinafter, the term polyarylene sulfoxides includes polyarylene sulfide sulfoxides. The polyarylene sulfoxides can also contain some sulfone groups. The preparation of the polymers containing sulfoxide groups is described, for example, in the German Patent Applications DE 4314735, DE 4314736, DE 4440010 and DE 19531163, which are incorporated by reference.

The molding composition preferably contains from 1 to 99% by weight (based on the total amount of polymer in the molding composition), particularly preferably from 1 to 50% by weight, in particular from 3 to 20% by weight, of a polymer containing sulfoxide groups.

The molding composition or a mixture comprising at least one polyamide and at least one polymer containing sulfoxide groups can be converted at temperatures above about 300° C. into a plastic foam.

The invention accordingly further provides a foam material obtainable by heating a mixture or molding composition comprising at least one polyamide and at least one polymer containing sulfoxide groups at a temperature of at least 300° C.

The invention also provides a process for producing a foam material by heating a mixture or molding composition comprising at least one polyamide and at least one polymer containing sulfoxide groups at a temperature of at least 300° C.

The achievable foaming effect depends on the type of polymer containing sulfoxide groups, in particular on the amount of sulfoxide groups and on the proportion of the polymer containing sulfoxide groups in the polymer mixture. In addition, the foaming effect depends on the melt viscosity of the polyamide to be foamed and on the processing temperature.

The heating of the mixture or the molding composition to make it foam is generally carried out in a temperature range from 200° C. to 450° C. The temperature range depends on the structure of the polymer containing sulfoxide groups which is used and on that of the polyamide to be foamed and can therefore also be outside the specified temperature range. When using polyphenylene sulfoxide (sulfoxide content at least 95%), the foam-formation temperature is preferably in the range from 300° C. to 350° C.

The invention also provides a multiphase blend obtainable by heating a mixture or molding composition comprising at least one polyamide and at least one polymer containing sulfoxide groups at a temperature at which no foam formation yet occurs and the polyamide is present as a melt.

For example, when using polyphenylene sulfoxide (sulfoxide content at least 95%), an unfoamed molding composition can first be produced at temperatures below 300° C. This unfoamed molding composition can be converted by thermal treatment above 300° C. into a foamed molding composition or a foamed molding.

According to the invention, the polyamide used can also be a mixture or blend of various polyamides and, if desired, other polymers and the polymer containing sulfoxide groups used can also be a mixture of various polymers containing sulfoxide groups.

The mixtures or molding compositions of the invention can contain customary additives such as thermal stabilizers, UV stabilizers, antistatics, flame retardants, dyes, pigments, inorganic and/or organic fillers (powders, fibers, etc.) or lubricant additives such as molybdenum disulfide, graphite or polytetrafluoroethylene.

To produce the foam, the polymer containing sulfoxide groups should be distributed as finely and uniformly as possible in the mixture or molding composition. This is achieved, for example, by use of fine powders. It is also possible to achieve good mixing by thermal processing, e.g. using commercial compounders or extruders, preferably twin-screw extruders, at temperatures at which the polyamide to be foamed melts.

The polymers containing sulfoxide groups, in particular those which do not melt at the processing temperatures, should be used as a very fine powder so as to achieve a uniform foam. In general, the mean particle sizes of the powder are in the range from about 0.3 to 500 µm, preferably from 5 to 300 µm, particularly preferably from 5 to 100 µm.

The mean molecular weight of the polymers containing sulfoxide groups, expressed as the weight average $M_w$, is generally between 4,000 and 200,000 g/mol, preferably between 10,000 and 150,000 g/mol, particularly preferably between 25,000 and 100,000 g/mol.

The molding composition of the invention as such and also the foam material produced therefrom can be used for producing moldings. The moldings can be used as high-performance functional components, for example in aircraft construction, in automobile construction and electronics. Further possible uses of the moldings are in the construction of chemical apparatus. The foams or moldings can also serve as heat-resistant insulation materials.

The materials can be foamed free or in pressing tools so that finished components, which are frequently in the form of an integral foam, can be obtained.

Advantages of the process according to the invention for producing polyamide foams are that no addition of low molecular weight blowing agents is necessary, the process can be carried out using simple technical means, foams having a particularly low density are possible and the degree of foaming and the pore size can be set within a wide range.

The invention is illustrated below by means of the examples, but without being restricted to the concrete embodiments presented.

EXAMPLES

1. Preparation of Polyphenylene Sulfoxide 54.08 g of polyphenylene sulfide (®Fortron 0205 B4, Hoechst) are suspended at room temperature in 300 ml of 99% strength dichloroacetic acid and 1 g of 95-97% strength sulfuric acid in a four-neck flask fitted with stirrer. Subsequently, while stirring, 46 g of $N_2O_4$ are added dropwise at a dropping rate of 1 ml/minute. The mixture is subsequently stirred for 2 hours at 50° C., with the polyphenylene sulfoxide formed going into solution after about 20 minutes. Excess $N_2O_4$ is partially given off as gas during stirring. Remaining $N_2O_4$ in the solution is driven off using nitrogen gas passed in through a capillary for 1 hour at 50° C. To precipitate the product, the solution is mixed with 4 l of deionized water (Ultraturrax). The product is filtered off and dried. ESCA analysis of the product indicates that about 98% of the sulfur groups of the polyphenylene sulfide used have been converted into sulfoxide groups (polyphenylene sulfoxide having a sulfoxide content of around 98%). The density of the polyphenylene sulfoxide is 1.40 g/cm$^3$.

2. Production of Polyamide Foam

A molding composition comprising 42.5 g of finely ground Nylon 46 and 7.55 g of finely ground polyphenylene sulfoxide was placed in an aluminum dish having the dimensions 7 cm×7 cm and heated in a closed oven for a period of 25 minutes at a temperature of 325° C. This resulted in formation of a foam having a dense, closed external skin (integral foam). The density of the foam was 0.33 g/cm$^3$ (for comparison: the density of the pure Nylon 46 is 1.18 g/cm$^3$).

The foam showed the temperature resistance expected for this polyamide.

We claim:

1. A molding composition based on (A) at least one polyamide and (B) at least one polymer containing sulfoxide groups, and wherein the polymer containing sulfoxide groups is polyphenylene sulfoxide, polyphenylene sulfide sulfoxide or polyphenylene sulfide sulfoxide sulfone.

2. A molding composition based on (A) at least one polyamide and (B) at least one polymer containing sulfoxide groups, wherein the polymer containing sulfoxide groups comprises polyarylene sulfoxide units of the formula —(—C$_6$H$_4$—SO—)— and wherein the arylene of the polymer containing sulfoxide groups is selected from the group consisting of monosubstituted monocyclic, polycyclic aromatic, a polysubstituted monocyclic and polycyclic aromatic.

3. A molding composition based on (A) at least one polyamide and (B) at least one polymer containing sulfoxide groups, and wherein the polyamide used is polyamide 46 or polyamide 66.

4. A molding composition as claimed in claim 1, containing from 1 to 99% by weight of the polymer containing sulfoxide groups.

5. A molding composition as claimed in claim 4, containing from 1 to 50% by weight of the polymer containing sulfoxide groups.

6. A molding composition as claimed in claim 5, containing from 3 to 20% by weight of the polymer containing sulfoxide groups.

7. A molding composition based on (A) at least one polyamide and (B) at least one polymer containing sulfoxide groups, obtained by heating the composition at a temperature at which any foam formation does not yet occur and at which the polyamide is present as a melt.

8. A molding composition as claimed in claim 1, wherein compound (B) has a sulfoxide content of at lest 50% (based on sulfur-containing bridges in the polymer).

9. A molding composition as claimed in claim 1, wherein component (B) has a sulfoxide content of at least 95% (based on all sulfur-containing bridges of the polymer.

10. A molding composition as claimed in claim 1, obtained by heating the composition at a temperature in the range from 200° C. to 450° C. for a time period of from 5 to 60 minutes to produce a foamed material.

* * * * *